US007086066B2

(12) United States Patent
Kappel et al.

(10) Patent No.: US 7,086,066 B2
(45) Date of Patent: Aug. 1, 2006

(54) SYSTEM AND METHOD FOR EXCEPTION HANDLING

(75) Inventors: Jochen Kappel, Vence (FR); Josef Markgraf, Goldbach (DE); Michael Meadows, Sundbvberg (SE)

(73) Assignee: Schlumbergersema Telekom GmbH & Co. KG (DE)

( * ) Notice: Subject to any disclaimer, the term of this patent is extended or adjusted under 35 U.S.C. 154(b) by 271 days.

(21) Appl. No.: 09/825,298

(22) Filed: Apr. 2, 2001

(65) Prior Publication Data

US 2002/0029299 A1   Mar. 7, 2002

Related U.S. Application Data

(60) Provisional application No. 60/193,422, filed on Mar. 31, 2000.

(30) Foreign Application Priority Data

Mar. 31, 2000  (EP)  ................................. 00106948

(51) Int. Cl.
*G06F 9/44* (2006.01)

(52) U.S. Cl. .......................... 719/318; 714/38; 717/126

(58) Field of Classification Search ................ 719/318, 719/315, 310; 717/126, 124; 714/38
See application file for complete search history.

(56) References Cited

U.S. PATENT DOCUMENTS

| 4,481,577 | A | * | 11/1984 | Forson | ........................... 707/1 |
|---|---|---|---|---|---|
| 5,761,407 | A | * | 6/1998 | Benson et al. | ................. 714/37 |
| 5,761,513 | A | * | 6/1998 | Yellin et al. | ................. 717/127 |
| 5,778,369 | A | * | 7/1998 | Pascoe et al. | ................ 707/100 |
| 5,815,708 | A | * | 9/1998 | Kessler et al. | .............. 719/318 |
| 5,911,069 | A | * | 6/1999 | Beard | .......................... 709/315 |
| 6,113,651 | A | * | 9/2000 | Sakai et al. | .................. 717/154 |
| 6,205,491 | B1 | * | 3/2001 | Callsen et al. | ............... 719/315 |
| 6,363,522 | B1 | * | 3/2002 | Click et al. | .................. 717/160 |
| 6,421,740 | B1 | * | 7/2002 | LeCroy | ....................... 709/331 |
| 6,742,123 | B1 | * | 5/2004 | Foote | ........................... 726/22 |

FOREIGN PATENT DOCUMENTS

WO    WO 00 07128 A    2/2000

OTHER PUBLICATIONS

C. Dony, "Improving Exception Handling with Object-Oriented Programming", IEEE, 1990, pp. 36-42.*
S. Feuerstein, et al Oracle PL/SQL Programming, O'Reilly, 1997, Chapter 8, Exception Handlers.*
Boyd: Customer Billing Technology and Issues—Annual Review of Communications International Engineering Consortium, Bd. 47, 1994, Seiten 800-806, XP000455398, Chicago, IL, US.
Kleissner: Enterprise Objects Framework—Sigmod Record, Bd. 24, Nr. 2, Jun. 1, 1995, Seiten 455-459, XP002047857, New York, NY, US.

* cited by examiner

*Primary Examiner*—William Thomson
*Assistant Examiner*—George L. Opie
(74) *Attorney, Agent, or Firm*—Dority & Manning, P.A.

(57) ABSTRACT

The present invention provides a system and method for providing exception handling for a computer program. In architecture, the system includes a class creator that establishes a plurality of classes of exception types, and an exception capture mechanism that captures an exception. An exception notice generator generates an exception notice for the exception. The present invention can also be viewed as a method for providing exception handling for a computer program. The method operates by establishing a plurality of classes of exception types, and capturing an exception. An exception notice for the exception is then provided.

6 Claims, 4 Drawing Sheets

FIG. 4

| CLASS AND ATTRIBUTES FOR EXCEPTIONS 70 |
|---|
| EXCEPTIONDICTIONARY ← 71 |
| EXECPTIONDEFINITION ← 72 |
| FORMATTEDMESSAGE ← 73 |
| SYSTEMEXCEPTION ← 74 |
| APPLICATIONEXCEPTION ← 75 |
| VALIDATIONEXCEPTION ← 76 |

SYSTEM AND METHOD FOR EXCEPTION HANDLING

CLAIM OF PRIORITY AND CROSS REFERENCE TO RELATED APPLICATIONS

This application claims the benefit of U.S. Provisional Patent Application entitled "Targys System," filed Mar. 31, 2000 and having Ser. No. 60/193,422, and copending U.S. Utility patent application Ser. No. 09/819,446 entitled, "Customer Care and Billing System," having filed on Mar. 28, 2001, which also claims priority to European Patent Application No. 00106948.3-2201, entitled "Customer Care and Billing System," filed Mar. 31, 2000, all of the foregoing of which are now pending and are incorporated herein by reference.

FIELD OF THE INVENTION

The present invention generally relates to computers and computer software, and more particularly, to a system and method for exception handling.

DESCRIPTION OF RELATED ART

Typically, today's computing and networking environments are complex and geographically distributed, and in the future they will be even more so. However, as the computing and networking environments become more complex, the operating systems become more complex at about an equal rate. One problem with this environment is that there may be errors in various places in an application. Normally, validation errors are caught by most object-to-object interactions, while application errors and system errors are generally propagated upward from the low-level code to specific places in the client or server. These application and system errors, i.e. exceptions, can in severe cases crash the system. To handle these exceptions or errors, programmers generally must provide detailed error or exception handling routines. This can be burdensome on the programmer and does not provide for a generalized or simplistic view of exception or error handling.

Thus, a heretofore-unaddressed need exists in the industry to address the aforementioned deficiencies and inadequacies.

SUMMARY OF THE INVENTION

The present invention provides a system and method for providing exception handling for a computer program. Briefly described, in architecture, the system of the preferred embodiment can be implemented as follows. The system includes a class creator that establishes a plurality of classes of exception types, and an exception capture mechanism that captures an exception. An exception notice generator generates an exception notice for the exception.

The present invention can also be viewed as a method for providing exception handling for a computer program. In this regard, the preferred method can be broadly summarized by the following steps. The method operates by (1) establishing a plurality of classes of exception types; (2) capturing an exception; and (3) providing an exception notice for the exception.

Other features and advantages of the present invention will become apparent to one with skill in the art upon examination of the following drawings and detailed description. It is intended that all such additional features and advantages be included herein within the scope of the present invention.

BRIEF DESCRIPTION OF THE DRAWINGS

The accompanying drawings incorporated in and forming a part of the specification illustrate several aspects of the present invention, and together with the description, serve to explain the principles of the invention. Moreover, in the drawings, like reference numerals designate corresponding parts throughout the several views. In the drawings:

FIG. 4 is a block diagram illustrating a class and method for providing exception handling, as shown in FIG. 3.

DETAILED DESCRIPTION OF THE PREFERRED EMBODIMENT

Figure 1:
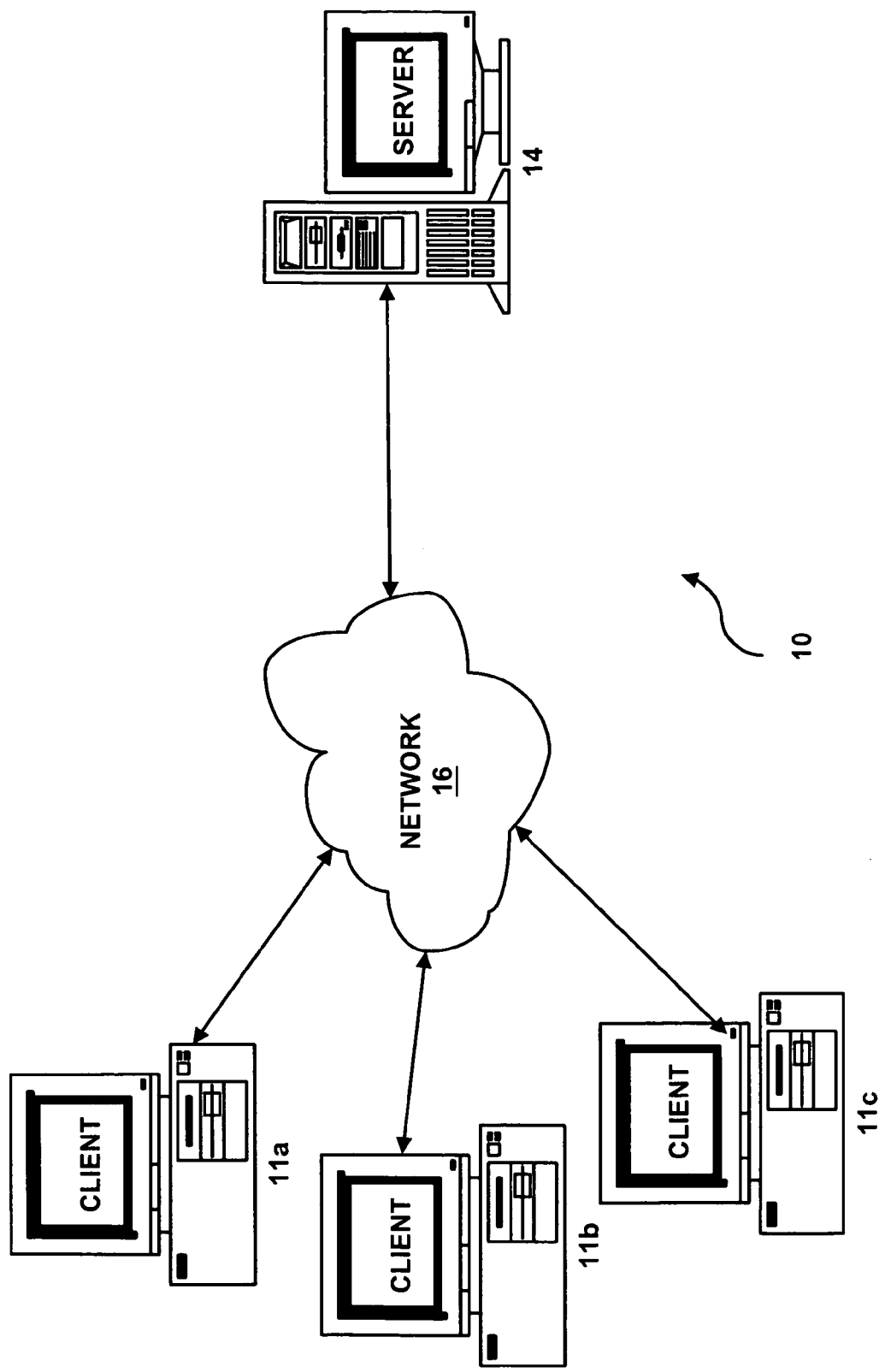
FIG. 1 is a block diagram illustrating an example of a network in which the exception handling system may be implemented.

Reference will now be made in detail to the description of the invention as illustrated in the drawings. While the invention will be described in connection with these drawings, there is no intent to limit it to the embodiment or embodiments disclosed therein. On the contrary, the intent is to cover all alternatives, modifications, and equivalents included within the spirit and scope of the invention as defined by the appended claims.

Referring now to the drawings, wherein like reference numerals designate corresponding parts throughout the drawings, FIG. 1 is a block diagram that portrays a diagram of a network that illustrates the flexibility, expandability, and platform independence in which the exception handling system of the present invention may be implemented. Referring to FIG. 1, a series of client computers 11a, 11b, 11c are connected to a server computer 14 via a network 16. The network 16 maybe, for example, but is not limited to, a dial-in network, local area network (LAN), wide area network (WAN), public switched telephone network (PSTN), Intranet, Internet, Ethernet type networks, and the like. The client computers 11a, 11b, 11c (hereinafter, 11) may be located within a LAN, WAN, PSTN, Intranet, Internet, Ethernet type networks, or the like. It should be noted that the number of client computers and server computers may differ from the number presently illustrated. Further, it should also be noted that, that the preferred embodiment of the invention describes the functionality provided by a server computer 14.

Figure 2:
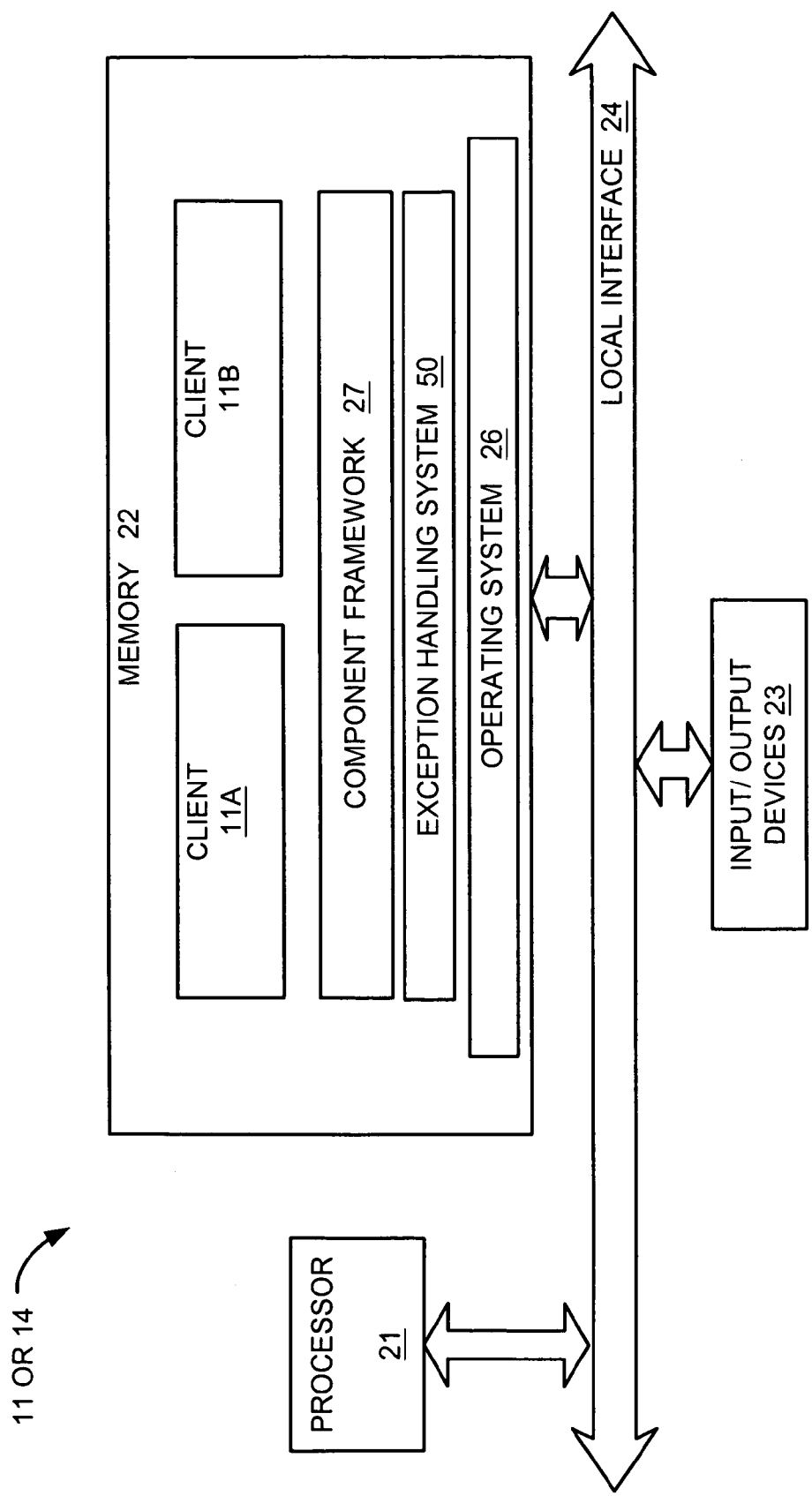
FIG. 2 is a block diagram illustrating an example of a computer system utilizing an operating system and exception handling system of the present invention.

An example of a general-purpose computer that can implement the exception handling system of the present invention is shown in FIG. 2. The exception handling system 50 of the invention can be implemented in software (e.g., firmware), hardware, or a combination thereof. In one embodiment, the exception handling system 50 is implemented in software, as an executable program, and is executed by a special or general purpose digital computer, such as a personal computer (PC; IBM-compatible, Apple-compatible, or otherwise), workstation, minicomputer, personal digital assistant (PDA) or mainframe computer.

Generally, in terms of hardware architecture, as shown in FIG. 2, the computers 11 or 14 include a processor 21, memory 22, and one or more input and/or output (I/O) devices 23 (or peripherals) that are communicatively coupled via a local interface 24. The local interface 24 can be, for example but not limited to, one or more buses or other wired or wireless connections, as is known in the art. The local interface 24 may have additional elements, which are omitted for simplicity, such as controllers, buffers (caches), drivers, repeaters, and receivers, to enable communications. Further, the local interface 24 may include address, control, and/or data connections to enable appropriate communications among the aforementioned components.

The processor 21 is a hardware device for executing software that can be stored in memory 22. The processor 21 can be virtually any custom made or commercially available processor, a central processing unit (CPU) or an auxiliary processor among several processors associated with the computer 11 and/or 14, and a semiconductor based microprocessor (in the form of a microchip) or a macroprocessor. Examples of suitable commercially available microprocessors are as follows: an 80×86 or Pentium series microprocessor from Intel Corporation, U.S.A., a PowerPC microprocessor from IBM, U.S.A., a Sparc microprocessor from Sun Microsystems, Inc, a PA-RISC series microprocessor from Hewlett-Packard Company, U.S.A., or a 68xxx series microprocessor from Motorola Corporation, U.S.A.

The memory 22 can include any one or combination of volatile memory elements (e.g., random access memory (RAM, such as DRAM, SRAM, etc.)) and nonvolatile memory elements (e.g., ROM, hard drive, tape, CDROM, etc.). Moreover, the memory 22 may incorporate electronic, magnetic, optical, and/or other types of storage media. Note that the memory 22 can have a distributed architecture, where various components are situated remote from one another, but can be accessed by the processor 21.

The software in memory 22 may include one or more separate programs, each of which comprises an ordered listing of executable instructions for implementing logical functions. In the example of FIG. 2, the software in the memory 22 includes the exception handling system 50 and a suitable operating system (O/S) 26.

A non-exhaustive list of examples of suitable commercially available operating systems 26 is as follows: a Windows operating system from Microsoft Corporation, U.S.A., a Netware operating system available from Novell, Inc., U.S.A., an operating system available from IBM, Inc., U.S.A., any LINUX operating system available from many vendors or a UNIX operating system, which is available for purchase from many vendors, such as Hewlett-Packard Company, U.S.A., Sun Microsystems, Inc. and AT&T Corporation, U.S.A. The operating system 25 essentially controls the execution of other computer programs, such as the exception handling system 50, and provides scheduling, input-output control, file and data management, memory management, and communication control and related services.

The exception handling system 50 may be a source program, executable program (object code), script, or any other entity comprising a set of instructions to be performed. When a source program, then the program is usually translated via a compiler, assembler, interpreter, or the like, which may or may not be included within the memory 22, so as to operate properly in connection with the O/S 26. Furthermore, the exception handling system 50 can be written as (a) an object oriented programming language, which has classes of data and methods, or (b) a procedure programming language, which has routines, subroutines, and/or functions, for example but not limited to, C, C++, Pascal, BASIC, FORTRAN, COBOL, Perl, Java, and Ada.

The I/O devices 23 may include input devices, for example but not limited to, a keyboard, mouse, scanner, microphone, etc. Furthermore, the I/O devices 23 may also include output devices, for example but not limited to, a printer, display, etc. Finally, the I/O devices 23 may further include devices that communicate both inputs and outputs, for instance but not limited to, a modulator/demodulator (modem; for accessing another device, system, or network), a radio frequency (RF) or other transceiver, a telephonic interface, a bridge, a router, etc.

If the computer 11 and/or 14, is a PC, workstation, or the like, the software in the memory 22 may further include a basic input output system (BIOS) (omitted for simplicity). The BIOS is a set of essential software routines that initialize and test hardware at startup, start the O/S 26, and support the transfer of data among the hardware devices. The BIOS is stored in ROM so that the BIOS can be executed when the computer 11 and/or 14 is activated.

When the computer 11 and/or 14 is in operation, the processor 21 is configured to execute software stored within the memory 22, to communicate data to and from the memory 22, and to generally control operations of the computer 11 and/or 14 pursuant to the software. The exception handling system 50 and the O/S 26 are read, in whole or in part, by the processor 21, perhaps buffered within the processor 21, and then executed.

Figure 3:
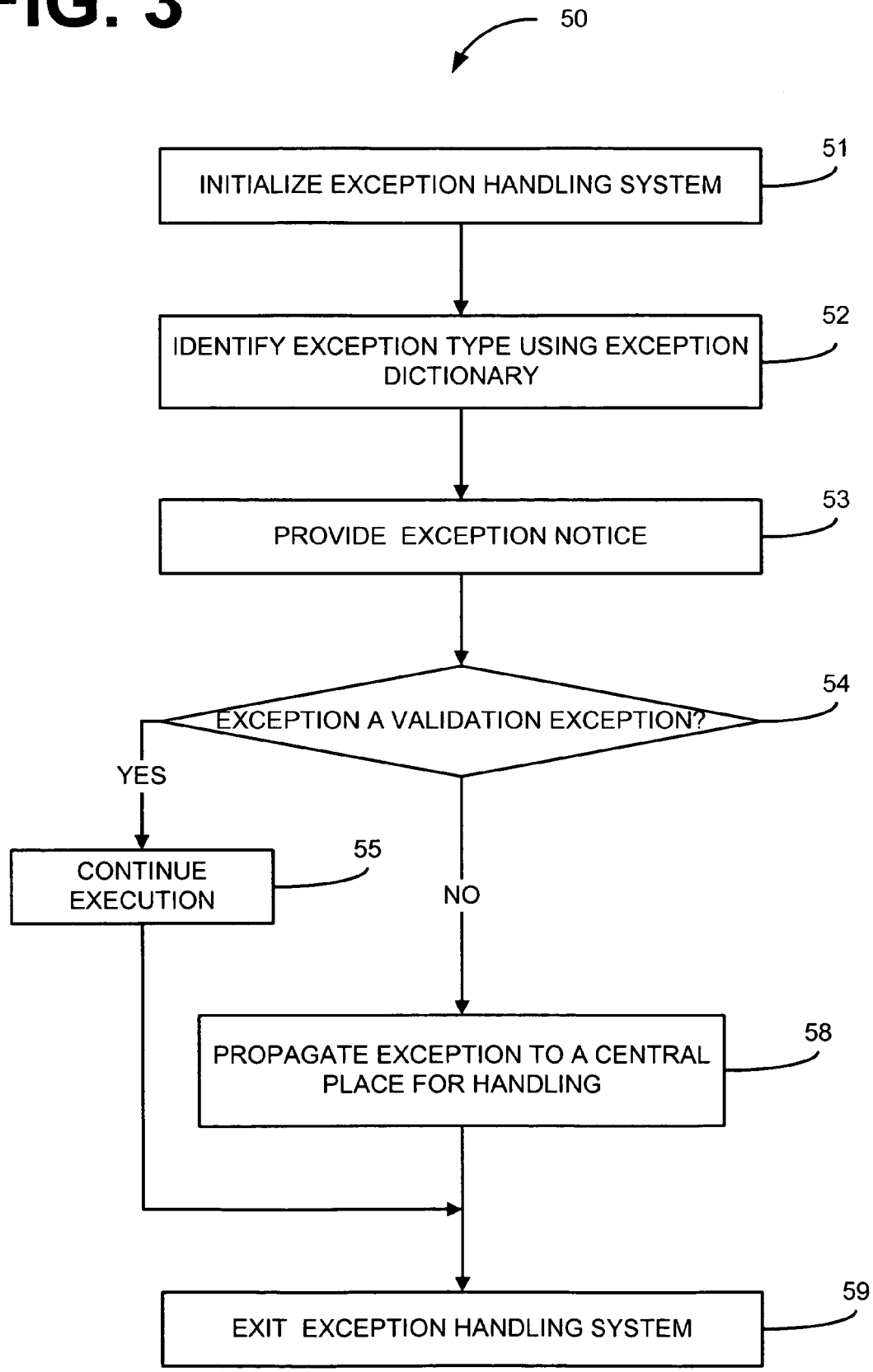
FIG. 3 is a flow chart illustrating an example of the process flow of the exception handling system of the present invention, as shown in FIG. 2 and FIG. 3.

When the exception handling system 50 is implemented in software, as is shown in FIG. 3, it should be noted that the exception handling system 50 can be stored on virtually any computer readable medium for use by or in connection with any computer related system or method. In the context of this document, a computer readable medium is an electronic, magnetic, optical, or other physical device or means that can contain or store a computer program for use by or in connection with a computer related system or method. The exception handling system 50 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

FIG. 3 is a data flow diagram illustrating an example of the process flow of the exception handling system 50 of the present invention. An exception is a signal that indicates that some sort of exceptional conditional has occurred. Signaling such an exceptional condition is known as "throwing" an exception. Recovering from an exceptional state is known as "catching" an exception. Thrown exceptions are propagated through the lexical block structure of a method, and then up through the method stack. If an exception is not caught by the blocks of code that throw it, it propagates to the next highest enclosing block of code. If it is not caught anywhere in the method, it propagates to the invoking method, and then propagates through the block structure. An exception can be propagated all the way up to the main method. Due to the propagation mechanism, a client 11 or server 14 can catch an exception anywhere in the application, but the location depends on the exception type.

Validation exceptions should be caught directly by the method where object-to-object communication is taking place. Every correction algorithm for a validation exception is unique. Therefore, it must be handled in the method which is throwing the validation exception. Application and system exceptions should be propagated in special places, where they can be handled in the usual way. Both of these exceptions appear because of unpredictable events, which should be handled at a central place for better code and maintenance, and extendability.

The exception handling system 50 of the present invention utilizes an instance strategy pattern utilizing three generic exception types. For each of the generic types, a new instance of these types can be defined. The number of instances are not restricted, and all instances are listed in an exception dictionary file. Reflecting on these capabilities, the following can be concluded. First, only three exceptions must be caught. This simplifies the exception handling, however, an unlimited number of exceptions can be defined. Second, changing exceptions have a weak effect on the interface definition language and the method signatures, because the exception types remain stable. An interface definition language is used to specify the interface in a client/server system. An interface definition language clears a set of operations, exceptions and attributes operating within the client server system. Each operation has a signature, which defines its name, parameters, result type, and exceptions. Third, a complex class hierarchy of exceptions is avoided, resulting in lower learning efforts. Utilized in the present invention are three different exception types. They are application exceptions, system exceptions, and validation exceptions. A general discussion of exception handling will be discussed with regard to FIG. 3.

The exception handling system 50 of the present invention first is initialized at step 51. At step 52, the exception handling system identifies the exception type using the exception dictionary. An exception dictionary 71 is illustrated in FIG. 4. As stated previously, there are three basic types of exceptions, validation exceptions, system exceptions, and application exceptions. After identifying the exception type utilizing the exception dictionary at step 52, the exception handling system 50 then provides an exception notice at step 53. This message is related to the formatted-message class 73 illustrated in FIG. 4.

At step 54, the exception handling system 50 of the present invention determines whether the exception experience is a validation exception. This is accomplished using the validationexception class 76 illustrated in FIG. 4. If it is determined at step 54 that the exception experience is a validation exception, the exception handling system 50 of the present invention proceeds to step 55 to continue execution of the current module and then exits at step 59.

However, if it is determined at step 54 that the exception experience is not a validation exception, then the exception handling system 50 of the present invention propagates the exception to a central place for handling at step 58. The exception handling system 50 then exits at step 59. Examples of the systemexception 74 class and applicationexception class 75 are illustrated in FIG. 4.

The foregoing description has been presented for purposes of illustration and description. It is not intended to be exhaustive or to limit the invention to the precise forms disclosed. Modifications or variations are possible in light of the above teachings.

The embodiment or embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly and legally entitled.

What is claimed is:

1. A method for providing exception handling for a computer program, said method comprising the steps of:
    establishing a plurality of classes of exception types, said plurality of exception types including application exceptions, system exceptions and validation exceptions;
    providing an exception dictionary used to list instances of each exception type;
    throwing an exception;
    identifying an exception type for the exception using the exception dictionary, wherein the identified exception type is one of an application exception, a system exception and a validation exception;
    providing an exception notice for the exception;
    determining in said identifying step that the exception is a validation exception;
    continuing processing of a current module in the computer program; and
    interfacing the exception handling features to a client/server system using an interface definition language, wherein the interface definition language clears a set of operations, exceptions and attributes operating within the client/server system.

2. The method of claim 1, further comprising a step of capturing the exception.

3. The method of claim 1, further comprising the steps of:
    determining in said identifying step that the exception is not a validation exception; and
    propagating the exception to a central place for handling.

4. A system for providing exception handling for a computer program, comprising:
    a class creator that establishes a plurality of classes of exception types, said plurality of exception types including application exceptions, system exceptions and validation exceptions;
    an exception dictionary used to list instances of each exception type;
    an exception determination mechanism that identifies an exception type for an exception using the exception dictionary, wherein the identified exception type is one of an application exception, a system exception and a validation exception;
an exception notice generator that generates an exception notice for the exception;
a processing mechanism that continues processing of a current module in the computer program when said exception determination mechanism identifies the exception type to be a validation exception; and
an interface definition language for specifying the interface of the exception handling system in a client/server system wherein said interface definition language clears a set of operations, exceptions and attributes operating within the client/server system.

5. The system of claim 4, further comprising an exception capture mechanism that captures an exception.

6. The system of claim 4, further comprising a processing mechanism that propagates the exception to a central place for handling when said exception determination mechanism identifies the exception type to be an exception other than a validation exception.

* * * * *